United States Patent [19]

Fowler et al.

[11] 3,753,369

[45] Aug. 21, 1973

[54] RECORDING OF RECIPROCAL OF TEMPERATURE

[75] Inventors: Lewis Fowler; Walter N. Trump, both of St. Louis, Mo.

[73] Assignee: Monsanto Corporation, St. Louis, Mo.

[22] Filed: Dec. 28, 1970

[21] Appl. No.: 102,123

[52] U.S. Cl. .......................... 73/15.4, 73/25, 73/54, 73/343.5, 73/362 AR
[51] Int. Cl. ........................ G01n 25/00, G01k 3/00
[58] Field of Search ..................... 73/362 AR, 15 B, 73/15.6, 1 F, 343.5, 23, 25, 54, 15.4

[56] References Cited
UNITED STATES PATENTS

| | | | |
|---|---|---|---|
| 2,271,975 | 2/1942 | Hall | 73/362 AR UX |
| 2,400,828 | 5/1946 | Keinath | 73/1 F UX |
| 2,741,126 | 4/1956 | Anderson et al. | 73/362 AR X |
| 3,076,955 | 2/1963 | Huddleston | 73/362 AR UX |
| 3,182,507 | 5/1965 | Rogen | 73/362 AR |
| 3,283,560 | 11/1966 | Harden et al. | 73/15 B |
| 2,727,968 | 12/1955 | Rittner et al. | 73/362 AR X |
| 3,339,398 | 9/1967 | Barrall et al. | 73/15 B |
| 3,369,390 | 2/1968 | Chu et al. | 73/15.6 |
| 3,550,427 | 12/1970 | Sueyoshi | 73/15.6 |

Primary Examiner—Richard C. Queisser
Assistant Examiner—Frederick Shoon
Attorney—Neal E. Willis, J. E. Maurer and William H. Duffey

[57] ABSTRACT

Direct recording of the relationship between a measured property and the reciprocal of absolute temperature is afforded in viscosity and vapor pressure measurements by means of resistance thermometry in cooperation with a bridge circuit.

5 Claims, 1 Drawing Figure

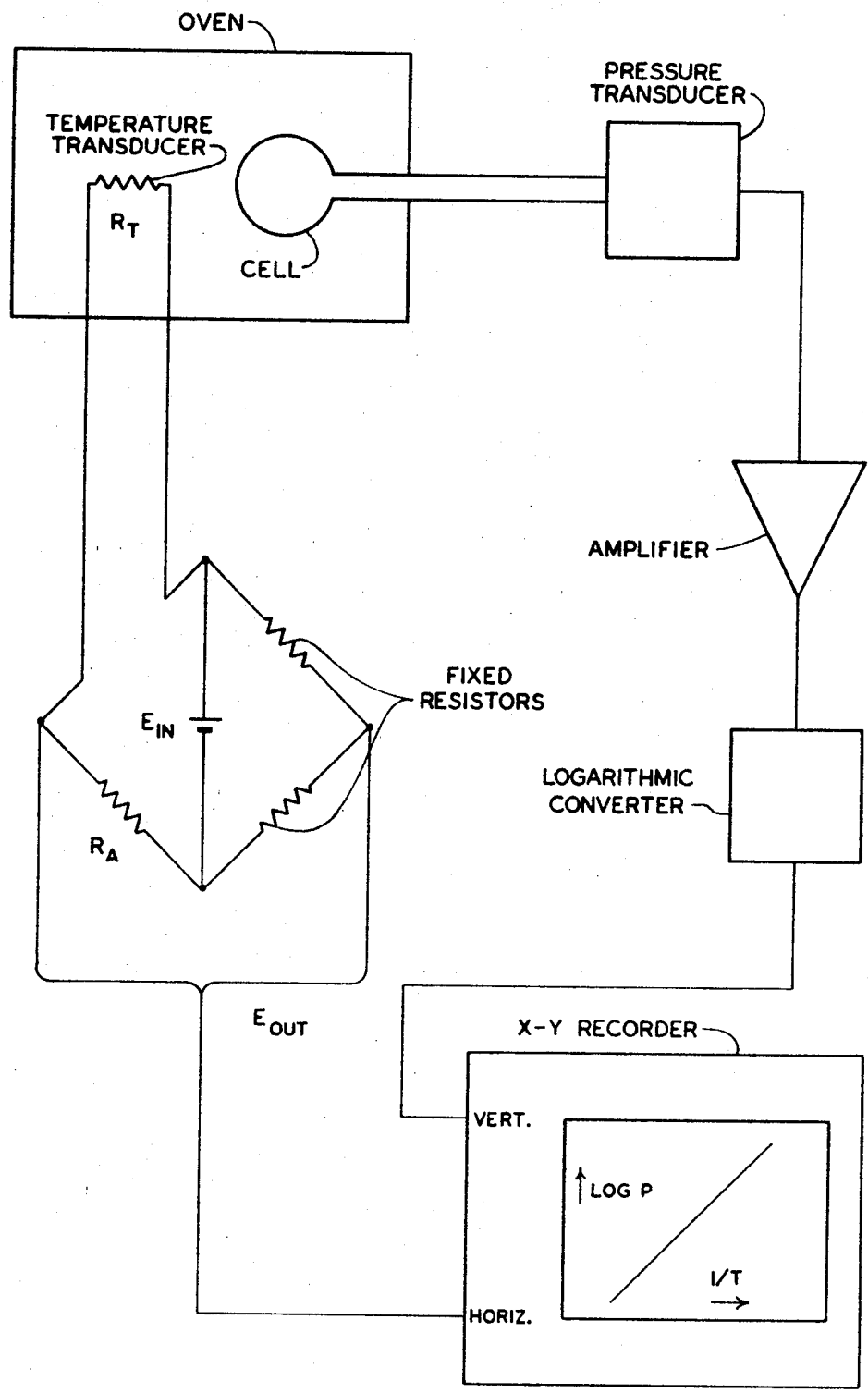

RECORDING OF RECIPROCAL OF TEMPERATURE

The present invention relates to a method for direct recording of certain physical variables as a function of inverse temperature, i.e., reciprocal of temperature.

Vapor pressure and viscosity are typical examples of variables adapted to the teachings of the present invention since they tend to be linear functions of reciprocal of absolute temperature.

One of the tests used in development of synthetic lubricants and hydraulic fluids for high temperature service is the measurement of vapor pressure as a function of fluid temperature. The vapor pressure may be measured directly to give an indication of the rate of evaporation loss to be expected. Alternatively, the rate of rise of apparent vapor pressure in a closed space may be measured as an indication of decomposition rate.

Prior to the advancement taught by the present invention, the known methods for vapor pressure measurements of the type described above were manual, usually employing an isoteniscope. The isoteniscope is an instrument for the static determination of vapor pressure from the change in level of a liquid in a U-tube. A salt bath is usually employed for heating and constant operator attention is required to measure vapor pressure by balancing against a measured pressure of nitrogen.

Viscosity is another variable applicable to the present teachings. Wide range recording of viscosity as a function of temperature is traditionally employed for evaluation of lubricants, functional fluids, lubricant additives and the like, and for general experimental viscosity measurements.

No complete theory has been developed on the relationship between viscosity of a liquid and liquid temperature but there are two major theories which have been applied, viz., the relaxation time theory and the activation energy theory. Each of these theories, however, relates to a limiting relationship in which the logarithm of viscosity is a linear function of the reciprocal of the absolute liquid temperature. Notwithstanding the fact that experimental viscosity data tend to deviate from this relationship, the deviation becoming more pronounced with increasing viscosity, the logarithm viscosity-reciprocal absolute temperature function provides a useful basis for plotting and correlating the viscosity data.

A long-standing need has prevailed for a method of recording such variables as vapor pressure and viscosity as a function of reciprocal of temperature, particularly reciprocal of absolute temperature. Prior art methods for recording viscosity, even though complex and expensive, are at best capable of plotting viscosity as a function of actual temperature.

The remarkable achievement afforded by the present invention was accomplished by a novel application of resistance thermometry to provide the inverse temperature function. Surprisingly and unexpectedly, by a determined choice of resistance values, the desired temperature relationship was achieved. It was thus discovered herein that a reciprocal temperature scale could be provided on a conventional linear millivoltage x-y recorder by use of a resistance temperature transducer in a suitable bridge circuit.

It is an object of the present invention, therefore, to provide a method for recording physical data as a linear function of reciprocal of temperature. Another object of the present invention is to afford recording of reciprocal of temperature with simplified electronic equipment. Yet another object of the present invention is to attain an inverse temperature relationship through use of a resistance thermometer and a Wheatstone bridge wherein the resistance values are of determined quantity and have a determined relationship. Other aspects, objects and advantages of this invention will become apparent from a consideration of the accompanying disclosure, drawing and appended claims.

The sole FIGURE of the drawing is a schematic diagram of a preferred embodiment which utilizes the method of the parent invention.

In the method of the present invention for recording reciprocal of temperature in the measurement of vapor pressure, viscosity and the like, a resistance thermometer is used in cooperation with a suitable bridge circuit. While resistance thermometer-bridge combinations are known in the prior art for measurement of temperature, the use of specialized bridge forms in such applications has heretofore been for the purpose of obtaining an output voltage proportional to actual temperature, not proportional to the reciprocal of temperature.

A useful working circuit for the purposes of the present invention is the well known Wheatstone bridge. The Wheatstone bridge is fundamentally a device used to measure the electrical resistance of an unknown resistor by comparing the resistor with a known standard resistance. The Wheatstone bridge circuit is a four-terminal network comprising four resistors interconnected in a square layout, to the input of which is applied a voltage. In the conventional application of the Wheatstone bridge, the values of three of the resistances are known and the value of the fourth resistance is determined by comparison with the known resistances.

In a preferred embodiment of the present invention, a platinum resistance temperature transducer of conventional design is connected to a direct current Wheatstone bridge. The bridge input voltage is identified herein as $E_{in}$. The output voltage of the bridge, designated herein as $E_{out}$, can be applied to the temperature axis of a conventional temperature recorder. The temperature transducer thus becomes one of the four resistance components of the Wheatstone bridge, its resistance being identified herein as $R_t$. This temperature transducer is the sensing device which senses the temperature to which the test fluid is exposed during measurements of fluid vapor pressure or fluid viscosity.

It has now been discovered that, by a suitable choice of resistance in the bridge arm in series with transducer resistance $R_T$, this resistance being identified herein as $R_A$, the bridge output voltage, $E_{out}$ becomes a linear function of reciprocal of Kelvin temperature over a wide range of fluid temperatures. Thus, the transducer resistance $R_T$ and the fixed resistance $R_A$, arranged in series, comprise one arm of the bridge and the direct input voltage $E_{in}$ is applied thereto. The remaining two bridge resistors in the four-resistor network are preferably chosen so as to have a resistance to fix the value of reciprocal of temperature for which $E_{out} = 0$.

The fundamental equation which characterizes the method of the present invention is as follows:

$$(E_{out} E_{in}) = (R_A / R_A + R_T)$$

where $R_T$ is the resistance of the temperature transducer or thermometer, $R_A$ is the resistance of the selected fixed resistor in series with $R_T$, $E_{in}$ is the input voltage applied to the bridge circuit and $E_{out}$ is the output voltage from the bridge circuit.

By a suitable choice of $R_A$, the following desired relationship is obtained:

$$(E_{out}/E_{in}) = (A/T) + B$$

where $A$ and $B$ are constants dependent upon the particular temperature transducer and $T$ is the absolute temperature of the fluid or other substance being tested.

Successful results have been achieved by adapting the method of the instant invention to an instrument for automatic recording of vapor pressure measurements on synthetic lubricants and hydraulic fluids. This instrument, called a recording tensimeter, supplants prior art methods which require laborious manual procedures. The basic design of the tensimeter comprises a sample cell in an air oven connected to a pressure transducer outside the oven, with a temperature transducer (having a resistance $R_T$) located within the oven and near the cell. The test fluid being evaluated, of course, is contained in the sample cell.

Ranges of temperature and pressure to be explored with the tensimeter were 0° to 500°C. and 10 to 1,000 torr, respectively. Two separate modes of operation were required: (1) recording of vapor pressure throughout the temperature range with a plot in the form of logarithm of vapor pressure versus reciprocal of temperature; and (2) recording of logarithm of increase of vapor pressure in a prescribed time interval at fixed temperatures in the range, with plotting of logarithm of pressure change versus reciprocal of temperature. Mode (1) thus represents the simple measurement of vapor pressure. Mode (2) provides the measurement of decomposition temperature which is defined as the temperature at which the pressure exerted by the sample vapor increases at the rate of 50 torr per hour due to production of gas by thermal decomposition.

The choice of a logarithm pressure versus reciprocal of Kelvin temperature method of plotting results from the well known relationship between vapor pressure and temperature. A linear relationship is also theoretically expected for the logarithm of rate of pressure increase as a function of reciprocal of Kelvin temperature. By implementing the method of the present invention in design of the automatic tensimeter, therefore, it was possible to use a single x-y recorder chart to display the results of both modes of operation. The motion along one axis of the recorder was made proportional to the reciprocal of Kelvin temperature and the motion along the other axis was made proportional to the logarithm of pressure.

It has been found that the method of the present invention is most advantageously employed in conjunction with a temperature transducer of the platinum resistance transducer type. It has further been found that the value of $R_A$ in series with $R_T$ in the bridge arm follows a rather defined relationship in achieving a bridge output $E_{out}$ which is a linear function of reciprocal of Kelvin temperature over a wide range of temperatures. More specifically, it has been found that $R_A$ is typically about 0.10 to 0.15 times $R_T$ at 0°C. for platinum resistance transducers.

To illustrate the method of the present invention for recording reciprocal of absolute temperature, an automatic recording tensimeter of the type described above was employed in making vapor pressure and decomposition temperature measurements on various liquids of known properties. The novel and vital component of the tensimeter was the bridge circuit hereinbefore described. Exemplary compounds tested were hexadecane, dioctyl phthalate and 1,3-bis(3-phenoxy) benzene. In general, the experimental results obtained with the tensimeter were in satisfactory agreement with literature data.

While this invention has been described with respect to various specific examples and embodiments, it is to be understood that the invention is not limited thereto and that it can be variously practiced within the scope of the following claims.

The embodiments of this invention in which an exclusive property or privilege is claimed are as follows:

1. A method for direct recording of a physical property of a substance as a substantially linear function of the reciprocal of the absolute temperature of said substance, which comprises the steps of
   a. exposing said substance to a determined temperature;
   b. sensing said physical property of said substance and obtaining a signal varying monotonically with the magnitude of said property at said determined temperature;
   c. applying said signal to one display input of a readout means;
   d. sensing the temperature of said substance with a resistance temperature transducer;
   e. applying the resistance of said transducer to a bridge circuit;
   f. applying an input voltage to said bridge circuit;
   g. selecting a determined resistance for the series bridge arm of said bridge circuit with respect to the resistance of said transducer so as to produce an output voltage from said bridge circuit which is a substantially linear function of the reciprocal of the absolute temperature of said substance;
   h. applying the output voltage from said bridge circuit to another display input of said readout means; and
   i. exposing said substance to further temperatures to obtain indications on said readout means sufficient to define the relationship between said physical property and the reciprocal of the absolute temperature of said substance.

2. A method of claim 1 wherein the physical property is viscosity.

3. A method of claim 1 wherein the physical property is vapor pressure.

4. A method of claim 1 wherein the physical property is decomposition rate.

5. A method of claim 1 wherein the resistance which is applied in series with the resistance of the transducer is from about 0.10 to about 0.15 times the resistance of the transducer at 0°C., the transducer being of the platinum resistance type.

* * * * *